US00H002173H

(19) United States
(12) Statutory Invention Registration
Newborn et al.

(10) Reg. No.: US H2173 H
(43) Published: Oct. 3, 2006

(54) HYDROPLANING UNMANNED SURFACE VEHICLE

(75) Inventors: David A. Newborn, Boca Raton, FL (US); Richard K. Knutson, Germantown, MD (US); Stephen P. Ebner, Wheaton, MD (US)

(73) Assignee: The United States of America as represented by the Secretary of the Navy, Washington, DC (US)

(21) Appl. No.: 10/617,445

(22) Filed: Jul. 10, 2003

(51) Int. Cl.
*B63B 1/00* (2006.01)

(52) U.S. Cl. ..... 114/247; 114/61.13; 114/61.12; 114/61.1

(58) Field of Classification Search ..... 114/271, 114/61.13, 61.12, 61.1
See application file for complete search history.

(56) References Cited

U.S. PATENT DOCUMENTS

| | | | | |
|---|---|---|---|---|
| 4,660,492 A | * | 4/1987 | Schlichthorst et al. | 114/67 A |
| 5,176,094 A | * | 1/1993 | Gongwer | 114/61.13 |
| 5,503,100 A | * | 4/1996 | Shaw | 114/274 |
| 5,544,607 A | | 8/1996 | Rorabaugh et al. | |
| 6,269,763 B1 | | 8/2001 | Woodland | |
| 6,409,122 B1 | | 6/2002 | Nicolai | |
| 6,567,044 B1 | | 5/2003 | Carroll | |

OTHER PUBLICATIONS

Helmut H. Portmann, et al., Unmanned Surface Vehicles: Past, Present, and Future, "Unmanned Systems," Sep./Oct. 2002, pp. 32–37.

* cited by examiner

*Primary Examiner*—M. Clement

(74) *Attorney, Agent, or Firm*—Steven W. Crabb

(57) ABSTRACT

An unmanned hydroplaning water surface vehicle having a gondola housing with external midway lift and control foils that allow the unmanned surface vehicle to provide lift and control in water at sufficient speed. A superstructure trimaran hull serves as a stable operation platform during low speed maneuvers or at rest. The superstructure hull encloses command and control systems capable of remote, semi-autonomous or fully autonomous control and navigation and vehicle attitude control. A plurality of mission specific payloads and sensors are positioned within the superstructure hull and gondola housing to allow for various types of missions. A strut connects the gondola housing and the superstructure hull above the waterline, as well as to provide for the passage therebetween of a plurality of transmission and control lines. The strut also mounts a rudder above propeller at the stern end of the gondola housing.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDROPLANING UNMANNED SURFACE VEHICLE

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

The present invention relates to unmanned vehicles, and more particularly to unmanned surface vehicles (USV) designed for use in rough or calm bodies of water.

Unmanned air, ground and underwater vehicles have been developed that perform numerous tasks and have proven extremely useful. However, USVs have not been developed to the same extent.

Littoral areas of operation may be denied, inaccessible or too hazardous to operate in with manned ships. Properly designed USVs could make these areas accessible for operation. No multimission USV has been developed that can operate for extended periods of time, in different sea conditions with numerous types of payloads and sensors. The applicants have developed a novel USV system that has the built in flexibility to perform multiple missions for extended periods of time such as mine countermeasure, anti-submarine warfare, and intelligence, surveillance and reconnaissance.

SUMMARY OF THE INVENTION

An unmanned hydroplaning water surface vehicle having a gondola housing with external lift foils located midway between bow and stern ends and control foils that allow the unmanned surface vehicle (USV) to plane in water at sufficient speed. A superstructure trimaran hull serves as a stable operation platform during low speed maneuvers or at rest. The superstructure hull includes command and control systems that make the USV capable of remote, semi-autonomous or fully autonomous operations. A plurality of mission specific payloads and sensors are dispersed in the superstructure and gondola to allow for various types of missions. A strut connects the gondola housing and the superstructure hull as sections of the vehicle, as well as provide for the passage of a plurality of transmission and control lines between such sections. A rudder is mounted on the strut at the stern end of the gondola housing above a propeller associated with its propulsion system.

For a better understanding of the present invention, together with other and further objects thereof, reference is made to the following description, taken in conjunction with the accompanying drawings, and its scope will be pointed out in the appended claims.

DESCRIPTION OF THE PREFERRED EMBODIMENT

Figure 1:
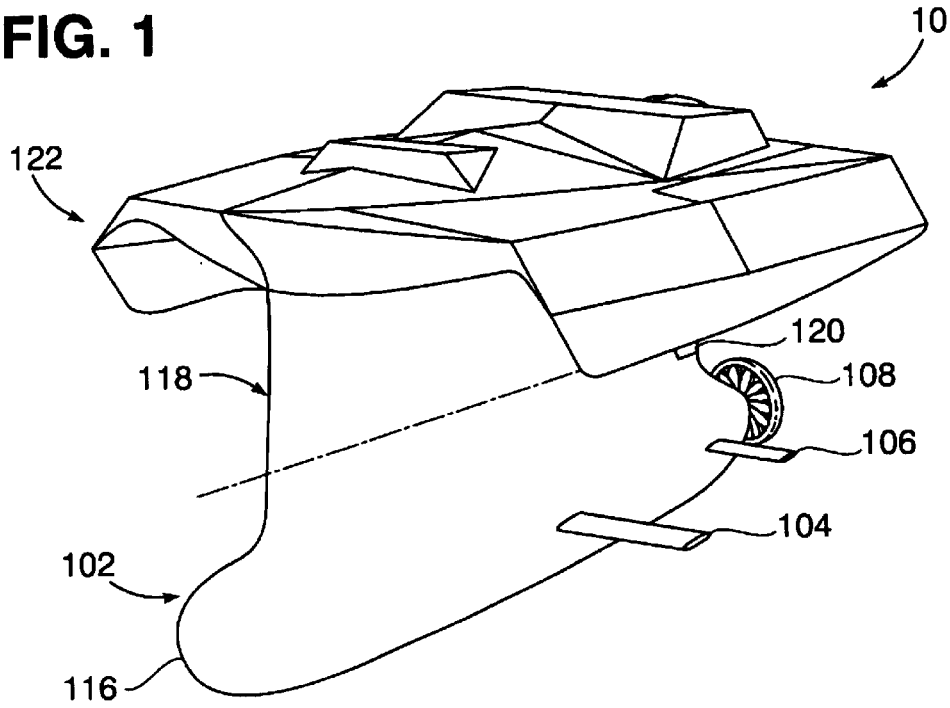
FIG. 1 is a perspective view of the unmanned surface vehicle of the present invention.

Referring now to the example of FIG. 1, the hydroplaning unmanned surface vehicle (USV) 100 includes three main sections; a single gondola housing 102, a strut 118, and a superstructure hull 122. The gondola housing 102 is connected to the superstructure hull 122 by the strut 118. The USV 100 is designed to be stable in rough seas when the craft is stationary or moving at low speeds. Once the USV 100 begins moving at high speeds, mid foils 104 located midway between bow and stern of the gondola housing 102 and aft foils 106 lift the gondola housing 102 of the USV 100 up to a waterline 105 reducing waterplane area.

Figure 4:
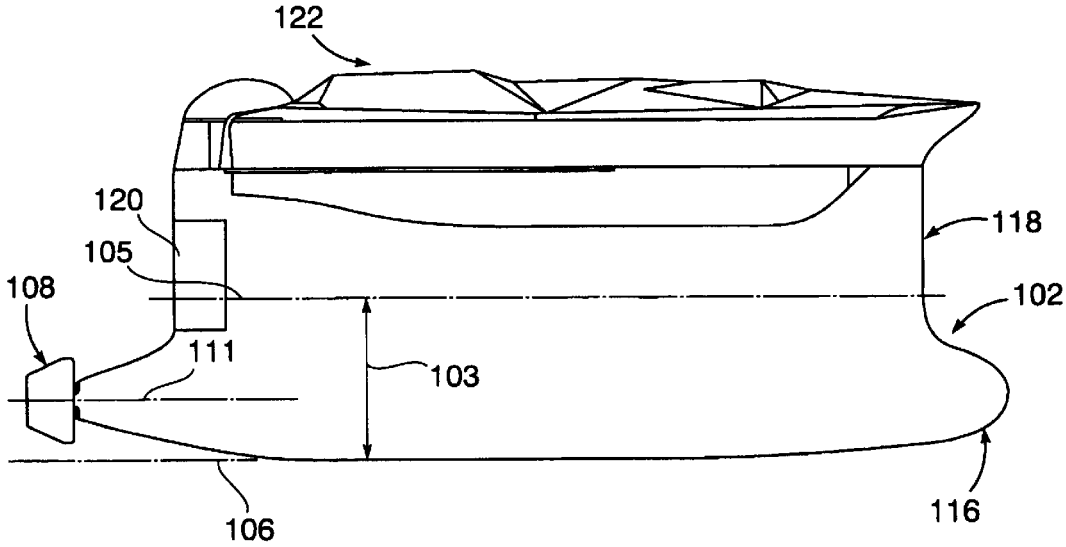
FIG. 4 is a side view of the unmanned surface vehicle of the present invention.
Figure 5:
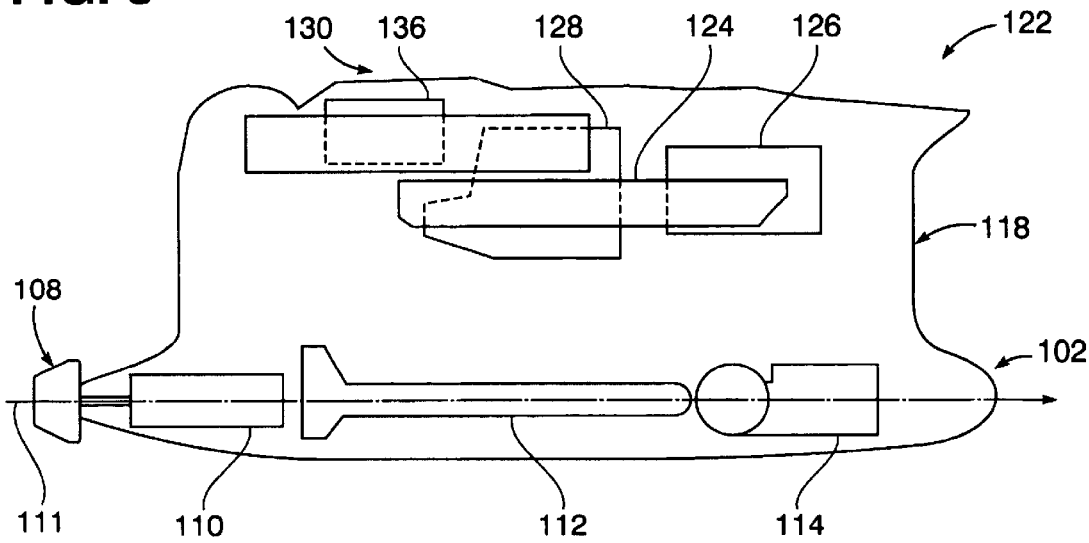
FIG. 5 is a cut away side view illustrating the layout of components in the unmanned surface vehicle of the present invention.

The gondola housing 102 preferably includes a ducted propeller 108 and a pair of the mid lift foils 104 and a pair of the aft lift foils 106. A propulsion motor 110, diagrammed in FIG. 5, drives the ducted propeller 108 to provide thrust to the USV 100. Many different types of payloads may be carried in a bay with retractable doors (not shown) in the gondola housing 102. For example, the USV 100 may be outfitted as shown in FIG. 5, with a winch 114 and a towed minehunting sonar system 112. The placement of the towed system 112 is designed to be inline with a thrust vector 111 along the centerline of the USV 100. In another embodiment the gondola housing 102 may include a sonar and sonar dome 116 as shown in FIG. 4. The lifting foils 104 and 106 attached to the gondola housing 102 provide roll, pitch, sinkage control. Sinkage is defined as the distance 103 between a baseline 106 and the waterline 105. The mid foils 104, located amidship, can be independently controlled to provide the necessary roll and sinkage control. The aft foils 106 move jointly to control the pitch and sinkage of the USV 100. Once the USV 100 reaches approximately 15 knots, the foils 104 and 106 provide enough lift so that the gondola housing 102 will plane to the waterline 105 lifting the superstructure hull 122 out of the water.

Figure 2:
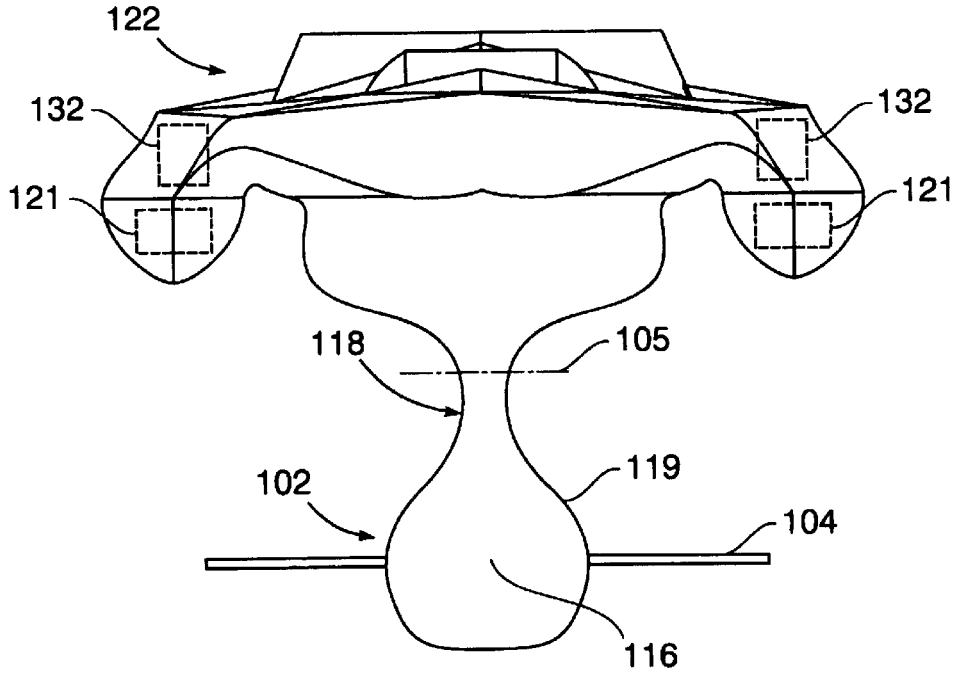
FIG. 2 is a front view of the unmanned surface vehicle of the present invention.

As shown in FIG. 4, the vertical strut 118 mounts a rudder 120 for both low and high speed control. To reduce drag caused by the submerged strut 118 and the gondola housing 102, it is preferable to provide the strut 118 with a fairing surface 119 as illustrated in FIG. 2, to provide a smooth transition for the interface between the strut 118 and the gondola housing 102. The fairing surface 119 establishes filleting transition boundaries between the strut 118 and the gondola housing 102. A number of passages for transmission and control lines extend through the strut 118 to permit electrical power, control signals, data signals and mechanical linkages to be sent between the gondola housing 102 and the superstructure hull 122.

As illustrated in the example of FIG. 2, the superstructure hull 122 is a trimaran configuration that will provide excellent stability in rough seas. The starboard outrigger side of the hull 122 houses a fuel tank 124, deployable payloads bay 130 a port outrigger housed fuel tank 126 as diagrammed in FIG. 5, and deployable payloads bay 132 as diagrammed in FIG. 2. The starboard payload bay 130 and the port payload bay 132 may be configured to accommodate numerous types of equipment such as torpedoes, sonobuoys, mine countermeasure devices, semi-autonomous undersea vehicles of fully autonomous undersea vehicles. Such configurable payload bays 130 and 132 make the USV 100 very flexible and capable of performing numerous types of missions.

As shown in the example of FIG. 5, the center portion of the superstructure hull 122 includes a generator 128 as a source of power for propulsion and various types of electronic equipment. By operating on the surface of the water, the USV 100 is able to utilize a conventional type of power source 128, such as diesel or gas turbine engines. This allows for up to several weeks of operational life.

Figure 3:
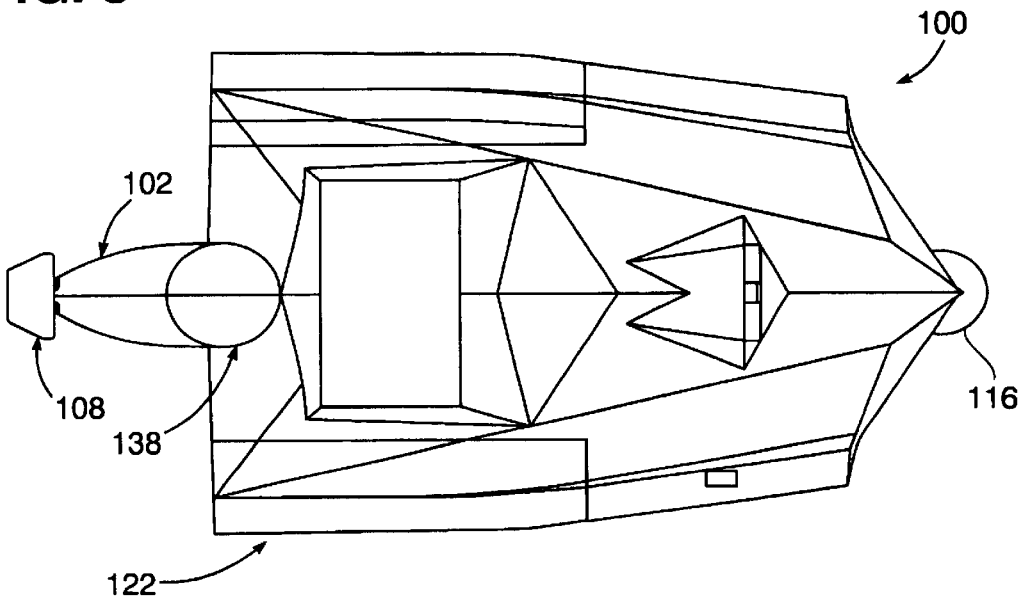
FIG. 3 is a top view of the unmanned surface vehicle of the present invention.

The superstructure hull 122 houses most of the command, control and communication systems for the USV 100. The superstructure hull 122 includes cabinets 134 and 136 for electronic equipment and various types of sensors (including intelligence, surveillance, and reconnaissance or ISR sensors). A cabinet 138 for communications as shown in the example of FIG. 3 is also provided. In the preferred embodiment the satellite communications cabinet 138 would be housed under a radome. The USV 100 would preferably be able to communicate to any combination of surface vessels, aircraft, or satellites as well as undersea assets. The electronic equipment in the cabinet 134 includes, command and control modules to permit autonomous, semi-autonomous or remote operation of the USV 100. The command and control techniques are similar to those employed in unmanned aerial vehicles (UAVs). Additionally, the electronic equipment would interface with the sensors in the cabinet 136 to analyze possible threats and to take the appropriate action. The superstructure hull 122 preferably is of low profile to reduce signatures and to increase intact hydrostatic stability.

In operation the USV 100 would be assigned to perform one of its primary missions such as anti-submarine warfare (ASW), mine countermeasure (MCM) or intelligence, surveillance and reconnaissance (ISR). Insertion into areas where there is threat of nuclear, biological or chemical agents is even possible. The USV 100 would be able to remain at a location for up to several weeks without resupply as it utilizes conventional power sources instead of mission limiting power supplies such as batteries.

The USV 100 could perform either alone or as part of a squadron of the USVs 100 to accomplish the missions identified. As part of a squadron the USVs 100 would be able to rapidly deploy at speeds up to 35 knots and patrol in a grid over a large area. Then the USV 100 could deploy a plurality of smaller unmanned undersea vehicles (USVs) from the payload bays 130 and 132 to provide extensive coverage within the grid. The USV 100 would then serve as a tender and communications hub for the USVs to collate data and transmit information to a central location for processing the data from the squadron. Additionally, it would be possible to have the USVs determine various courses of action such as mine or submarine neutralization independently or to wait for instructions. By operating in this manner the USV 100 could clear an area of threats prior to manned ships transiting the area.

While there have been described what are believed to be the preferred embodiments of the present invention, those skilled in the art will recognize that other and further changes and modifications may be made thereto without departing from the spirit of the invention, and it is intended to claim all such changes and modifications that fall within the true scope of the invention.

What is claimed is:

1. An unmanned water surface vehicle comprising: a gondola housing section having bow and stern ends with external foils located midway between the bow and stern ends to provide lift in water at sufficient speed, said gondola housing section mounting a propulsion system at the stern end; a superstructure hull located entirely above a waterline and a strut connecting said gondola housing section to said superstructure hull completely above the waterline.

2. An unmanned water surface vehicle as defined in claim 1, wherein said strut mounts a rudder above the stern end of the gondola housing section and the propulsion system.

3. An unmanned water surface vehicle comprising:

a gondola housing having external foils spaced from a stern end thereof to provide lift in water at sufficient speed, a propulsion system at said stern end, a superstructure hull adapted to float on the water at sub foil lifting speeds, means for connecting said gondola housing and said superstructure housing hull; and a rudder mounted on said connecting means above the propulsion system at the stern end.

4. An unmanned water surface vehicle as defined in claim 3, wherein said means for connecting said gondola housing and said superstructure hull comprises: a faired strut.

5. The water surface vehicle as defined in claim 3, wherein said means for connecting the gondola housing and the superstructure hull comprises: a strut extending between forward and aft ends of the vehicle in underlying relation to the hull; and said propulsion system including: a propulsion motor mounted within the gondola housing adjacent said stern end thereof; and a propeller connected to the propulsion motor positioned in rearwardly spaced relation to said aft end of the vehicle at which the rudder is mounted.

* * * * *